United States Patent Office 3,124,571
Patented Mar. 10, 1964

3,124,571
PROCESS FOR HYDROXYLATION OF 16α,17α-KETALS AND ACETALS OF CORTICAL HORMONES AND PRODUCTS DERIVED THEREFROM
Howard J. Ringold and George Rosenkranz, Mexico City, Mexico, assignors, by mesne assignments, to Syntex Corporation, a corporation of Panama
No Drawing. Filed May 19, 1960, Ser. No. 30,080
Claims priority, application Mexico Jan. 26, 1960
16 Claims. (Cl. 260—239.55)

The present invention relates to a new method for preparing certain cyclopentanophenanthrene derivatives.

More specifically, it relates to the introduction of a hydroxyl group at C–11β of the cyclic 16α,17α-ketals and 16α,17α-acetals of the 6α-fluoro-16α-hydroxy derivatives of Reichstein's compound "S" or of 1-dehydro "S," by incubation with the fungus *Cunninghamella blakesleeana* ATCC 8688a or ATCC 8688b or the fungus *Cunninghamella bainieri* ATCC 9244 to thus form the respective ketals and acetals of 6α-fluoro-16α-hydrocortisone and of 6α-fluoro-16α-hydroxy-prednisolone, respectively.

In combination with such new method of hydroxylation at C–11, the present invention comprises the subsequent introduction of a halogen atom at C–9α, preferably of fluorine, the oxidation of the 11β-hydroxy group to the keto group, the esterification of the hydroxyl group at C–21 and the hydrolysis of an ester group at this position, as well as the introduction of an additional double bond at C-1,2 where none is present in the starting material.

In accordance with the present invention there are prepared the cyclic acetals and ketals of 6α-fluoro-16α-hydroxy derivatives of hydrocortisone, cortisone, prednisolone and prednisone, with or without fluorine atom at C–9α, as well as the 21-esters of such steroids, which are extremely potent cortical hormones and are of particular value since they do not cause the retention of sodium in the human organism. Such hormones have already been obtained by a different route, as described and claimed by Ringold, Zderic, Djerassi and Bowers in copending application Serial No. 819,545, filed June 11, 1959.

The starting compounds in the procedure of the present invention are the cyclic 16α,17α-ketals and 16α,17α-acetals of the 6α-fluoro-16α-hydroxy derivatives of compound "S" and 1-dehydro-"S," whose 21-acetates have been described and claimed in our copending application Serial No. 56, filed on January 4, 1960, which in turn is a continuation-in-part of our copending application Serial No. 807,774, filed on April 21, 1959, both of said applications being now abandoned.

The present application is a continuation-in-part of the aforementioned applications Serial No. 56 and Serial No. 807,774.

The following formulas schematically illustrate the introduction of the hydroxyl group at C–11β into the acetonides of 6α-fluoro-16α-hydroxy-"S" or its 1-dehydro-analog; such formulas further illustrate the introduction of a fluorine atom at C–9α into the resulting compounds:

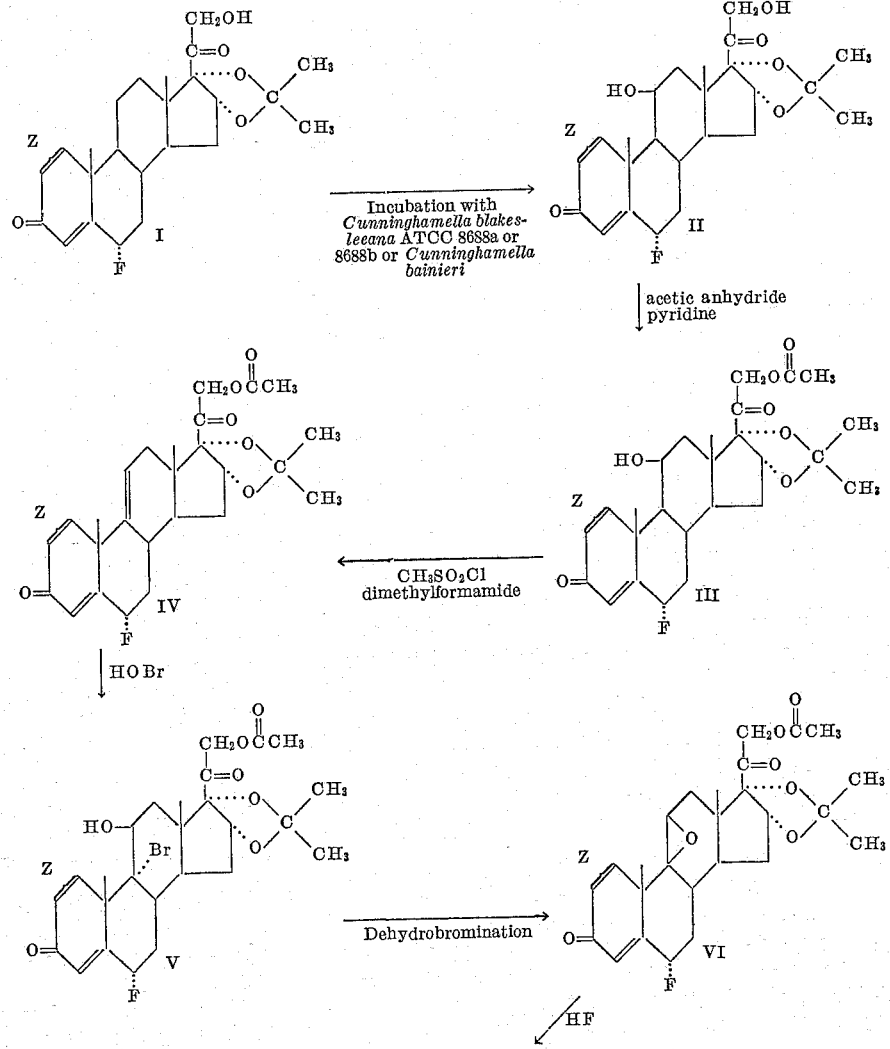

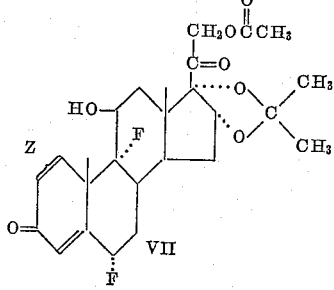

In the above formulas, Z indicates a single bond or a double bond between C-1 and C-2.

In accordance with the method of the present invention, I is incubated with a culture of the fungus *Cunninghamella bainieri* ATCC 9244 or *Cunninghamella blakesleeana* ATCC 8688a or *Cunninghamella blakesleeana* 8688b, preferably of the latter, in a sterile aqueous medium, with stirring and under aeration at temperature around 28° C. Instead of the acetonide, another ketal or acetal group at C-16, 17 may be employed such as those formed from formaldehyde, acetaldehyde, paraldehyde, benzaldehyde, benzophenone, acetophenone, methyl ethyl ketone, cyclohexanone, diethyl ketone or other aldehydes and ketones containing up to 14 carbon atoms of straight, branched, cyclic or mixed aliphatic-cyclic chain, saturated or unsaturated, including aromatic groups. The incubation period may vary within wide limits, for example between 1 day and 3 days; the incubation proceeds with better results if carried out for 48 hours. It is preferable to effect the introduction of the 11β-hydroxyl group into a compound of Formula I having the hydroxyl group at C-21 in the free form; however, there may also be used an ester of such compound, such as the acetate, since the incubation simultaneously causes the conversion of the ester group into the hydroxyl group. By extraction with a solvent non-miscible with water such as methylene chloride, followed by concentration of the extract, recrystallization from a solvent such as methanol or a mixture of acetone and hexane or methanol and methylene chloride, or absorption on a column composed of a mixture of silica gel and celite, there is obtained the 11β-hydroxylated steroid in purified form.

The most surprising discovery is that a cyclic ketal or acetal, particularly the acetonides per se, can be fermented, that the acetonide group remains unchanged during the process of fermentation and that the incubation proceeds with yields rarely achieved in microbiological oxidation; it is unusual and unexpected to recover in high yields the 11β-hydroxylated steroidal compound since it is well known that incubation of compounds containing esterified hydroxy groups result in low yields. It was also found that the success of the incubation depends on the species of the Cunninghamella fungus: The species *Cunninghamella bainieri* ATTC 9244, *Cunninghamella blakesleeana* ATTC 8688a and 8688b produce the 11β-hydroxylated steroid in much higher yields than other species of this fungus, and practically without attacking other points of the steroidal molecule. With these particular organisms, the acetonide ferments better than the corresponding free 16α,17α-diol. It is also possible to employ a mixture of such organisms for the incubation. It is obvious that the species of *Cunninghamella bainieri* and *Cunninghamella blakesleeana* set forth above can also be used for the 11β-hydroxylation of steroids lacking the substituent at C-6 and/or the ketal or acetal group at C-16, 17, or differing in another manner from the starting compounds of the present invention. For example, the 11β-hydroxyl group can also be introduced into the acetonide of 16α-hydroxy "S" without fluorine at C-6 or with chlorine at C-6.

For introducing the fluorine atom at C-9α the compounds of Formula II are first esterified at C-21, preferably they are acetylated to give the compounds of Formula III. In accordance with the method of Fried et al. (J. Am. Chem. Soc. 79, 1130 (1857)) they are then dehydrated (IV), then reacted with hypobromous acid and the resulting bromohydrins (V) are dehydrobrominated to produce the respective 9β,11β-oxido-compounds (VI); the opening of the oxide ring by reaction with hydrogen fluoride give rise to the formation of the respective compounds of Formula VII.

When starting from a 16,17-ketal or 16,17-acetal other than the acetonide, there are obtained all of the compounds with the respective group at C-16, 17; if II is esterified at C-21 with the radical of an acid other than acetic acid there are obtained the corresponding compounds of Formulas III–VII with the respective ester group.

The esterification of the hydroxyl group at C-21 is preferably carried out by a conventional method of reaction with the anhydride or chloride of a carboxylic acid in pyridine; the anhydrides and chlorides are derived from carboxylic acids containing up to 12 carbon atoms, which acids may be of straight, branched, cyclic or aliphatic-cyclic chain, saturated, unsaturated, optionally substituted with groups such as hydroxyl, acyloxy (of up to 12 carbon atoms), alkoxy (of up to 6 carbon atoms), amino, nitro and halogen; typical of such esters are acetate, propionate, t-butylacetate, enanthate, hemisuccinate, caproate, benzoate, phenoxyacetate, cyclopentylpropionate and β-chloropropionate.

In the compounds esterified at C-21, the 11β-hydroxyl group is oxidized to the keto group by treatment with chromic acid in acetic acid (dilute).

The hydrolysis of an ester group at C-21 is effected by reaction with dilute methanolic sodium or potassium hydroxide at low temperature. A double bond is introduced at C-1, 2 either by purely chemical methods or by microbiological methods; by refluxing with selenium dioxide, preferably in t-butanol and in the presence of catalytic amounts of pyridine, there is introduced a double bond at C-1, 2 in the compounds esterified at C-21; by incubation with *Corynebacterium simplex* ATCC 6946 such double bond is introduced in the compounds having the hydroxyl group at C-21 in the free form, although the compounds having an ester group at C-21 may also be used for such microbiological dehydrogenation. In the latter case, the dehydrogenation proceeds with the simultaneous conversion of the acyloxy group into the hydroxyl group. Such dehydrogenations are applied both to the $\Delta^4$-compounds with an oxygen function at C-11 (11β-hydroxyl or keto) and to the $\Delta^{4,9(11)}$-compounds.

The conditions for the reactions set forth above, described in detail in the following examples, may be modified within wide limits, both with respect to the reagents and solvents employed as with respect to the conditions of temperature and time.

The following specific examples serve to illustrate but are not intended to limit the present invention:

*Example I*

A mixture of 2 g. of the 21-acetate of 6α-fluoro-16α,17α-isopropylidenedioxy-$\Delta^4$-pregnen-21-ol-3,20-dione and 20 ml. of 1% methanolic potassium hydroxide solution was stirred for 1 hour at 0° C. under an atmosphere of nitrogen and diluted with water; the precipitate was collected by filtration, washed with water, dried and recrystallized from acetone-hexane, thus giving the free 6α-fluoro - 16α,17α - isopropylidenedioxy-$\Delta^4$-pregnen-21-ol-3,20-dione.

There was prepared an aqueous culture medium containing 20 g. of peptone and 50.0 g. of corn syrup in 1000 ml. The medium was divided in 200 ml. portions in 1000 ml. Erlenmeyer flasks and inoculated with a suspension in sterile water of a one week culture of *Cunninghamella blakesleeana* ATCC 8688b grown in agar-Sabouraud-glucose. The inoculated flasks were incubated for a period of 48 hours under stirring at 300 r.p.m. and at a temperature of 28° C.

At the end of this time the resulting vegetating mycelium was separated by centrifuging the culture, suspended in 400 ml. of sterile water and homogenized in a blender. This suspension was employed to inoculate a 14 lt. glass fermentor containing 5 lt. of the following medium:

| | |
|---|---|
| Cornsteep liquor (solid content 6 g.) cc | 100 |
| $NH_4H_2PO_4$ g | 3.0 |
| $CaCO_3$ g | 2.5 |
| Soya oil g | 2.2 |
| Yeast extract g | 2.5 |
| Dextrose g | 10.0 |

Distilled water to make one liter.

Together with the inoculate there was added to the fermentor 1.0 g. of 6α-fluoro-16α,17α-isopropylidenedioxy-$\Delta^4$-pregnen-21-ol-3,20-dione dissolved in 50 ml. of ethanol.

The mixture was incubated for 48 hours at 28° C. with stirring (300 r.p.m.) and aeration at the rate of 200 cc. per minute.

At the end of this incubation period the mycelium was separated which, after drying, weighed 43.7 g.; the filtrate was extracted with methylene chloride, the extract was washed with water, dried over anhydrous sodium sulfate and evaporated to dryness under reduced pressure; the residue was dissolved in 10 ml. of pyridine, treated with 1.5 ml. of acetic anhydride and the mixture was kept overnight at room temperature. It was then poured into water, heated for half an hour on the steam bath, cooled and the precipitate was collected and purified by recrystallization from methylene chloride-methanol. There was thus obtained 560 mg. of the acetate of the acetonide of 6α-fluoro-16α-hydroxy-hydrocortisone (M.P. 272–273° C.).

*Example II*

In accordance with the procedure described in Example I, there was prepared 6.6 g. of the acetonide of the 21-acetate of 6α-fluoro-16α-hydroxy-hydrocortisone, which was then mixed with 160 ml. of dimethylformamide, 9.5 ml. of pyridine and 6.6 ml. of methanesulfonyl chloride and heated on the steam bath for 2 hours; it was then poured into ice water and the solid was collected by filtration, washed with water, dried and purified by crystallization from methylene chloride-methanol. There was thus obtained 4.45 g. of the acetate of 6α-fluoro-16α,17α-isopropylidenedioxy-$\Delta^{4,9(11)}$-pregnadien-21-ol-3,20-dione; M.P. 280–281° C.; $[\alpha]_D+88°$ (chloroform); $\lambda$max. 234 m$\mu$, log E 4.22.

To a solution of 4.5 g. of the above compound in 80 ml. of dioxane was added 6.1 ml. of 0.5 N perchloric acid and then treated at room temperature with 1.9 g. of N-bromoacetamide which was added in three portions in the course of half an hour. The stirring was continued for 4½ hours at the end of which, the mixture was poured into 200 ml. of 5% aqueous sodium bisulfite solution; the product was extracted with methylene chloride and the extract was washed with water, dried over anhydrous sodium sulfate and evaporated to dryness under reduced pressure. There was thus obtained 6α-fluoro-9α-bromo-16α,17α-isopropylidenedioxy-21-acetoxy-$\Delta^4$-pregnen-21-ol-3,20-dione which was used for the next step without further purification.

The above bromohydrin was dissolved in 300 ml. of acetone and the solution was refluxed for 7 hours with 7 g. of anhydrous sodium acetate. The acetone was then evaporated, water was added and the product was extracted with methylene chloride; the extract was washed with water, dried over anhydrous sodium sulfate and evaporated to dryness; recrystallization from methylene chloride-methanol afforded 6α-fluoro-16α,17α-isopropylidenedioxy-21-acetoxy-9β,11β-oxido-$\Delta^4$-pregnene-3,20-dione; M.P. 275–276° C. $[\alpha]_D+84.5°$ (chloroform); $\lambda$max. 236 m$\mu$, log E 4.18.

2.5 g. of the above oxido-compound was dissolved in 100 cc. of methylene chloride and the solution was treated with 12 g. of anhydrous hydrogen fluoride dissolved in 20 g. of tetrahydrofuran, at a temperature around −60° C. The mixture was allowed to react for 1 hour at this temperature and then for 48 hours at a temperature between 0° C. and 5° C., at the end of which time the mixture was poured into ice cold saturated aqueous sodium bicarbonate solution. The product was then extracted with methylene chloride and the extract was washed with water, dried over anhydrous sodium sulfate and the solvent was evaporated. The residue was treated with 10 ml. of acetic anhydride and 20 ml. of pyridine and heated on the steam bath for half an hour. The reaction mixture was evaporated to dryness under reduced pressure and the residue was purified by recrystallization from methylene chloride-methanol, decolorizing with charcoal, to produce 1.48 g. of the acetate of the 16α,17α-acetonide of 6α,9α-difluoro-16α-hydroxy-hydrocortisone, M.P. 268–273° C.; $[\alpha]_D+101°$ (chloroform); $\lambda$max. 234 m$\mu$, log E 4.22.

The above compound (1.4 g.) was mixed with 0.7 g. of selenium dioxide, 125 ml. of t-butanol and 0.15 ml. of pyridine and refluxed under an atmosphere of nitrogen for 96 hours, at the end of which it was filtered and the filtrate was evaporated to dryness under reduced pressure. The residue was dissolved in ethyl acetate and the solution was successively washed with 5% aqueous sodium bicarbonate solution and water, dried over anhydrous sodium sulfate and evaporated to dryness. The residue was chromatographed on 40 g. of silica gel; upon elution with mixtures of acetone-methylene chloride (1:19), there were obtained solid fractions which after recrystallization from methanol furnished the acetate of the 16α,17α-acetonide of 6α,9α-difluoro-16α-hydroxy-prednisolone; M.P. 308–311° C.; $[\alpha]_D+83°$ (chloroform); $\lambda$max. 237 m$\mu$, log E 4.18.

1 g. of the above compound was treated with 20 ml. of 1% methanolic potassium hydroxide solution and kept at 0° C. and under an atmosphere of nitrogen for 1 hour, at the end of which it was acidified with acetic acid and concentrated to a small volume; it was then diluted with water and the precipitate formed was collected, washed with water, dried and recrystallized from acetone-hexane, thus yielding the 16α,17α-acetonide of the free 6α,9α-difluoro-16α-hydroxy-prednisolone; M.P. 265–266° C.; $[\alpha]_D$ −95° (chloroform); $\lambda$max. 238 m$\mu$, log E 4.20.

*Example III*

The procedure described in Example I was repeated, but instead of incubating the 6α-fluoro-16α,17α-isopropylidenedioxy-$\Delta^4$-pregnen-21-ol-3,20-dione, the corresponding acetate was employed. Since the incubation caused the simultaneous conversion of the 21-acetoxy group into the hydroxyl group, there was also obtained in this case the acetonide of the free 6α-fluoro-16α-hydroxy-hydrocortisone, which was then acetylated at C-21.

*Example IV*

Exactly as described in Example I, the acetate of the acetonide of 6α-fluoro-21-acetoxy-$\Delta^{1,4}$-pregnadiene-16α,17α-diol-3,20-dione (disclosed in our copending application Serial No. 56) was converted into the acetonide of the free 6α-fluoro-$\Delta^{1,4}$-pregnadiene-16α,17α,21-triol-3,20-dione, by hydrolysis by reaction with methanolic potassium hydroxide solution; it was then incubated with a culture of the fungus *Cunninghamella blakesleeana* 8688b to produce the crude 6α-fluoro-16α,17α-isopropylidenedioxy-$\Delta^{1,4}$-pregnadiene-11β,21-diol-3,20-dione; upon subsequent acetylation, followed by chromatography on silica gel, there was obtained the acetate of 16α,17α-isopropylidenedioxy-6α-fluoro-Δ$^{1,4}$-pregnadiene-11β,21 - diol-3,20-dione, namely the acetate of the acetonide of 6α-fluoro-16α-hydroxy-prednisolone.

Exactly as described in Example II, there was then obtained by dehydration the acetate of 6α-fluoro-16α,17α-isopropylidenedioxy-Δ$^{1,4,9(11)}$-pregnatrien - 21 - ol - 3,20-dione; by reaction with N-bromoacetamide and perchloric acid there was then formed the 21-acetate of the acetonide of 6α-fluoro-9α-bromo-16α-hydroxy-prednisolone and this compound was converted into the acetate of the acetonide of 6α - fluoro - 9β,11β-oxido-Δ$^{1,4}$-pregnadiene-16α,17α,21-triol-3,20-dione; the acetate of the acetonide of 6α,9α-difluoro-16α-hydroxy-prednisolone was then obtained by reaction of the oxido compound with hydrogen fluoride. By hydrolysis of the acetate group, by the procedure described in Example II, there was obtained the acetonide of the free 6α,9α-difluoro-16α-hydroxy-prednisolone, identical with the one obtained in Example II.

Example V

Exactly as described in Example II, there was prepared 2 g. of the acetate of 6α-fluoro-16α,17α-isopropylidenedioxy-Δ$^{4,9(11)}$-pregnadien-21-ol-3,20-dione, which was mixed with 2 g. of selenium dioxide, 200 ml. of t-butanol and 0.25 ml. of pyridine and refluxed under an atmosphere of nitrogen for 96 hours, at the end of which time the solid was removed by filtration and the filtrate was evaporated to dryness under reduced pressure. The residue was dissolved in ethyl acetate and the solution was successively washed with acqueous saturated sodium bicarbonate solution and water, dried over anhydrous sodium sulfate and evaporated to dryness. The residue was chromatographed on 60 g. of silica gel; the product was eluated with mixtures of methylene chloride-acetone and the solid fractions were recrystallized from methanol, thus affording the acetate of 6α-fluoro-16α,17α-isopropylidenedioxy-Δ$^{1,4,9(11)}$-pregnatrien-21-ol-3,20-dione, identical with the intermediate compound obtained in accordance with Example IV.

Example VI

By incubation of the 21-acetate of the 16,17-acetonide of 6α-fluoro-Δ$^{1,4}$-pregnadiene-16α,17α,21-triol-3,20 - dione with a culture of Cunninghamella blakesleeana 8688b, exactly as described in Example I, there was introduced the hydroxyl group at C–11β and the acetoxy group at C–21 was simultaneously converted into the hydroxyl group, thus yielding the acetonide of 6α-fluoro-Δ$^{1,4}$-pregnadiene-11β,16α,17α,21-tetrol-3,20-dione which was purified by crystallization from acetone-hexane.

Example VII

All of the experiments described in Examples I, III, IV, and VI were repeated, but employing instead of a culture of Cunninghamella blakesleeana 8688b a culture of Cunninghamella blakesleeana 8688a, which culture was prepared in strict analogy with the procedure reported in Example I. The incubation afforded similar results to the ones obtained when using species of Cunninghamella blakesleeana ATCC 8688b, with somewhat lower yields.

Example VIII

The step of incubation of Examples I, III, IV, VI, and VII with the species of Cunninghamella blakesleeana set forth (ATCC 8688a and ATCC 8688b) was repeated, but extending the incubation period to 3 days; there were obtained the same results in the cubation.

Example IX

The steps of incubation described in Examples I, III, IV, VI, VII, and VIII were repeated and the residue resulting from the extraction of the incubation product was purified by chromatography on silica gel and then by recrystallization of the solid eluates from acetone-hexane. There were thus obtained the 6α-fluoro-derivatives of the acetonides of 16α-hydroxy-hydrocortisone and of 16α-hydroxy-prednisolone, respectively, having the hydroxyl group at C–21 in the free form.

Example X

The experiments of the preceding examples were repeated, but instead of incubating the acetonides of the respective compounds, there were incubated other 16α,17α-cyclic ketals of such compounds as well as 16α,17α-acetals of the same. Thus, for example, in accordance with Example I, from 6α - fluoro-16α,17α-ethylidenedioxy-Δ$^4$-pregnen-21-ol-3,20-dione, there was obtained the acetate of 6α - fluoro - 16α,17α-ethylidenedioxy-Δ$^4$-pregnene-11β,21-diol-3,20-dione; the latter was then treated as described in Example II, to produce finally 6α,9α-difluoro - 16α,17α - ethylidenedioxy - Δ$^{1,4}$ - pregnadiene - 11β,21-diol-3,20-dione. The intermediates corresponded to those set forth in Example II but having the ethylidenedioxy group at 16α,17α instead of the isopropylidenedioxy group.

Example XI

In accordance with the procedure of Example I, there was incubated the acetonide of 6α - fluoro-16α-hydroxy "S" with Cunninghamella blakesleeana ATCC 8688b and the crude product resulting from the incubation was treated with propionic anhydride in pyridine; there was thus obtained the propionate of the acetonide of 6α-fluoro - 16α-hydroxy-hydrocortisone. In turn this compound was subjected to the procedure described in Example II to produce finally the acetonide of 6α,9α-difluoro-16α-hydroxy-hydrocortisone, via the corresponding 2-acyloxy intermediates set forth in such example, but having at C–21 the propionoxy group instead of the acetoxy group.

Example XII

The oxidation of the 11β-hydroxy group of the respective compounds set forth in Examples I–XI, esterified at C–21, was carried out by treatment with chromic acid in aqueous acetic acid at room temperature, using a solution of 1 g. of the 11β-hydroxy-steroid in 50 cc. of glacial acetic acid and adding to this solution approximately 350 mg. of chromium trioxide dissolved in 20 cc. of 50% acetic acid. The oxidizing agent was added little by little, maintaining the temperature around 15° C. and under continuous stirring; the mixtutre was then kept at room temperature for 1 hour further, diluted with ice water and the precipitate formed was collected, washed with water, dried and recrystallized from acetone-hexane.

Thus the acetates of the acetonides of 6α-fluoro-16α-hydroxy-hydrocortisone (Example I) and of its Δ$^{1,4}$-derivative (Example IV) were converted into the acetates of the acetonides of 6α-fluoro-16α-hydroxycortisone and of 6α-fluoro-16α-hydroxy-prednisone; the acetates of the acetonides of 6α,9α-difluoro-16α-hydroxy-hydrocortisone and of its Δ$^{1,4}$-analog, which compounds are described in Example II, were oxidized to the acetates of the 16α,17α - acetonides of 6α,9α-difluoro-16α-hydroxycortisone and of 6α,9α - difluoro-16α-hydroxy-prednisone; the acetate of 6α,9α - difluoro-16α,17α - ethylenedioxy-Δ$^{1,4}$-pregnadiene-11β,21-diol-3,20-dione, intermediate in Example X, was oxidized to the acetate of 6α,9α-difluoro-16α,17α - ethylidenedioxy - Δ$^{1,4}$ - pregnadien - 21 - ol - 3,11,20-trione; the propionate of the acetonide of 6α-fluoro-16α-hydroxy-hydrocortisone as well as the propionate of the acetonide of 6α,9α - difluoro-hydrocortisone (cf. Example XI) were converted into the propionates of the acetonides of 6α-fluoro-16α-hydroxy-cortisone and 6α,9α-difluoro-cortisone, respectively.

Example XIII

The method of dehydrogenation by refluxing with selenium dioxide in t-butanol and in the presence of catalytic amounts of pyridine, as described in Example II was applied to the introduction of an additional double bond at C-1, 2 into the acetate of the acetonide of 6α-fluoro-16α-hydroxy-hydrocortisone, intermediate in Example II, to produce the acetate of the acetonide of 6α-fluoro-16α-hydroxy-prednisolone. By the same method of dehydrogenation at C-1, 2 by reaction with selenium dioxide there was also introduced a double bond at C-1, 2 into the compounds esterified at C-21 which have been set forth in Example XII.

*Example XIV*

30 ml. of a 1% aqueous solution of yeast extract was placed in each of 30 Erlenmeyer flasks of 125 ml. capacity and the contents of each flask was inoculated with a culture of *Corynebacterium simplex* ATCC 6946, obtained by incubating a 1% aqueous medium of yeast extract with a suspension of such bacterium for 72 hours. It was then stirred for 24 hours at 28° C., and thus there was produced the culture of Corynebacterium which was used for the incubation with the steroid.

To each flask there was added 1 ml. of a 1% ethanol solution of 6α-fluoro-16α,17α-isopropylidenedioxy-$\Delta^4$-pregnene-11β,21-diol-3,20-dione (Example IX), which solution had been prepared at room temperature just before its use and employing redistilled ethanol. The mixture was then incubated for 24 hours at 28° C. under continuous stirring; in other experiments the incubation period was extended to 72 hours without altering the result of the dehydrogenation.

The contents of the flasks was then combined in 3 fractions; each fraction was extracted with 5 portions of methylene chloride, using 500 ml. of solvent for each extraction. All the extracts were combined, washed with water, dried over anhydrous sodium sulfate and the methylene chloride was evaporated. The residue was purified by chromatography on silica gel; upon subsequent crystallization from acetone-hexane there was obtained 6α-fluoro-16α,17α-isopropylidenedioxy-$\Delta^{1,4}$-pregnadiene-11β,21-diol-3,20-dione.

*Example XV*

For applying the incubation with *Corynebacterium simplex* of the preceding example to other compounds, described in the preceding examples, such compounds were preferably employed with the free hydroxyl group at C-21. By treatment with dilute methanolic potassium hydroxide solution, in accordance with Example II, the acetonides of the acetates of 6α-fluoro-$\Delta^{4,9(11)}$-pregnadiene-16α,17α,21-triol-3,20-dione (Example II) and of 6α,9α-difluoro-$\Delta^4$-pregnene-11β,16α,17α,21-tetrol-3,20-dione (Example II), were converted into the acetonides of 6α-fluoro-$\Delta^{4,9(11)}$-pregnadiene-16α,17α,21-triol-3,20-dione and of 6α,9α-difluoro-$\Delta^4$-pregnene-11β,16α,17α,21-tetrol-3,20-dione; the incubation with *Corynebacterium simplex* ATCC 6946 then afforded the acetonides of 6α-fluoro-$\Delta^{1,4,9(11)}$-pregnatriene-16α,17α,21-triol-3,20-dione and of 6α,9α-difluoro-$\Delta^{1,4}$-pregnadiene-11β,16α,17α,21-tetrol-3,20-dione. Similarly there was hydrolyzed the acetoxy group of 6α-fluoro-16α,17α-ethylidenedioxy-21-acetoxy-$\Delta^4$-pregnen-11β-ol-3,20-dione, of 6α-fluoro-16α,17α-ethylidenedioxy-21-acetoxy-$\Delta^{4,9(11)}$-pregnadiene-3,20-dione and of 6α,9α-difluoro-16α,17α-ethylidenedioxy-21-acetoxy-$\Delta^4$-pregnen-11β-ol-3,20-dione, which compounds have been set forth in Example X, and then by the incubation with *Corynebacterium simplex* there were obtained 6α-fluoro-16α,17α-ethylidenedioxy-$\Delta^{1,4}$-pregnadiene-11β,21-diol-3,20-dione, 6α-fluoro-16α,17α-ethylidenedioxy-$\Delta^{1,4,9(11)}$-pregnatrien-21-ol-3,20-dione and 6α,9α-difluoro-16α,17α-ethylidenedioxy-$\Delta^{1,4}$-pregnadiene-11β,21-diol-3,20-dione. By the alkaline treatment set forth above there was hydrolyzed the propionoxy group of the propionates of the acetonides of 6α-fluoro-$\Delta^4$-pregnene-11β,16α,17α,21-tetrol-3,20-dione, of 6α-fluoro-$\Delta^{4,9(11)}$-pregnadiene-16α,17α,21-triol-3,20-dione and of 6α,9α-difluoro-$\Delta^4$-pregnene-11β,16α,17α,21-tetrol-3,20-dione, which compounds have been described in Example XI; the incubation then afforded the acetonides of 6α-fluoro-$\Delta^{1,4}$-pregnadiene-11β,16α,17α,21-tetrol-3,20-dione, of 6α-fluoro-$\Delta^{1,4,9(11)}$-pregnatriene-16α,17α,21-triol-3,20-dione and of 6α,9α-difluoro-$\Delta^{1,4}$-pregnadiene-11β,16α,17α,21-tetrol-3,20-dione.

Furthermore, there was hydrolyzed the ester group at C-21 of the 11-keto compounds set forth in Example XII and then there was introduced a double bond at C-1, 2 by incubation with *Corynebacterium simplex* ATCC 6946.

*Example XVI*

A mixture of 1 g. of 6α-fluoro-16α,17α-isopropylidenedioxy-$\Delta^4$-pregnen-21-ol-3,20-dione 21-acetate and 10 cc. of 1% methanolic potassium hydroxide was stirred for 1 hour at 0° C. and under an atmosphere of nitrogen. The mixture was diluted with water and the precipitate was collected by filtration, washed with water, dried and recrystallized from acetone-hexane, thus affording the free 6α-fluoro-16α,17α-isopropylidenedioxy-$\Delta^4$-pregnen-21-ol-3,20-dione.

A culture of *Cunninghamella bainieri* ATCC 9244 was prepared by inoculating an aqueous medium containing 2% of peptone and 5% of corn syrup with a vegetating growing culture of such fungus prepared in the same medium and then incubating at 28° C. for 24 hours.

To each liter of this culture there was added 30 cc. of a 1% solution of 6α-fluoro-16α,17α-isopropylidenedioxy-$\Delta^4$-pregnen-21-ol-3,20-dione in methanol and the mixture was stirred under aeration at 28° C. for 24 hours. A total of 5 g. of the steroid was incubated in this manner. The product was extracted with several portions of methylene chloride and the extract was washed with water, dried over anhydrous sodium sulfate and concentrated to a small volume under reduced pressure.

The total combined extracts were absorbed on a column prepared with a mixture of 60 g. of celite and 60 g. of silica gel previously washed with methylene chloride. The product was then eluted from the column with a mixture of methylene chloride and acetone, 80:20, the solvent was evaporated and the residue crystallized from acetone-methylene chloride. There was thus obtained the 16α,17α-acetonide of 6α-fluoro-16α-hydroxy-hydrocortisone.

We claim:

1. A method for preparing a 6α-fluoro-11β-hydroxy-cortical hormone selected from the group consisting of the 16α,17α-cyclic ketal of 6α-fluoro-16α-hydroxy-hydrocortisone, the 16α,17α-cyclic ketal of 6α-fluoro-16α-hydroxy-prednisolone, the 16α,17α-cyclic acetal of 6α-fluoro-16α-hydroxy-hydrocortisone and the 16α,17α-cyclic acetal of 6α-fluoro-16α-hydroxy-prednisolone in which the cyclic acetal and the cyclic ketal groups each contain up to 14 carbon atoms comprising incubating the corresponding 11-desoxy compound with a fungus selected from the group consisting of *Cunninghamella bainieri* ATCC 9244, *Cunninghamella blakesteeana* ATCC 8688a and *Cunninghamella blakesleeana* ATCC 8688b.

2. The method of claim 1, wherein the incubation is conducted in an aqueous medium at about 28° C., under stirring and aeration for a period of 24 hours to 72 hours, the crude incubation product is extracted with a solvent non-miscible with water, the extract is concentrated and the residue is purified by recrystallization from a solvent.

3. The method of claim 2, wherein the residue is purified by chromatography, preferably on a mixture of silica gel and celite.

4. A method for preparing a 6α-fluoro-11β-hydroxy-cortical hormone selected from the group consisting of the 16α,17α-cyclic ketal of 6α-fluoro-16α-hydroxy-hydrocortisone, the 16α,17α-cyclic ketal of 6α-fluoro-16α-hydroxy-prednisolone, the 16α,17α-cyclic acetal of 6α-fluoro-16α-hydroxy-hydrocortisone and the 16α,17α-cyclic acetal of 6α-fluoro-16α-hydroxy-prednisolone comprising incubating the corresponding 11-desoxy-21-acyloxy compound in which the acyl group is derived from a hydrocarbon carboxylic acid containing up to 12 carbon atoms with a fungus selected from the group consisting of *Cunninghamella blakesleeana* ATCC 8688a, *Cunninghamella blakesleeana* ATCC 8688b, and *Cunninghamella bainieri* ATCC 9244.

5. The method of claim 4, wherein the starting material is the acetonide of 6α-fluoro-Δ⁴-pregnene-16α,17α,21-triol-3,20-dione 21-acetate and there is obtained the acetonide of 6α-fluoro-16α-hydroxy-hydrocortisone.

6. The method of claim 1, wherein the starting material is the acetonide of 6α-fluoro-Δ⁴-pregnene-16α,17α,21-triol-3,20-dione and there is obtained the acetonide of 6α-fluoro-16α-hydroxy-hydrocortisone.

7. The method of claim 1, wherein the starting material is the acetonide of 6α-fluoro-Δ¹,⁴-pregnadiene-16α,17α,21-triol-3,20-dione and there is obtained the acetonide of 6α-fluoro-16α-hydroxy-prednisolone.

8. The method of claim 6, wherein the fungus is *Cunninghamella blakesleeana* ATCC 8688a.

9. The method of claim 6, wherein the fungus is *Cunninghamella blakesleeana* ATCC 8688b.

10. The method of claim 6 wherein the fungus is *Cunninghamella bainieri* ATCC 9244.

11. The method of claim 7 wherein the fungus is *Cunninghamella blakesleeana* ATCC 8688a.

12. The method of claim 7 wherein the fungus is *Cunninghamella blakesleeana* ATCC 8688b.

13. The method of claim 7 wherein the fungus is *Cunninghamella bainieri* ATCC 9244.

14. The method of claim 1 wherein the starting compound is 6α-fluoro-16α-17α-ethylidenedioxy-Δ⁴-pregnen-21-ol-3,20-dione and there is obtained 6α-fluoro-16α,17α-ethylidenedioxy-Δ⁴-pregnene-11β,21-diol-3,20-dione.

15. A compound of the following formula:

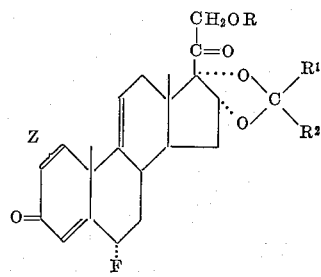

wherein R is a hydrocarbon carboxylic acyloxy group of less than 12 carbon atoms; R' and R² are each selected from the group consisting of hydrogen and a hydrocarbon group containing up to 14 carbon atoms; and Z is selected from the group consisting of a saturated linkage between C–1 and C–2 and a double bond between C–1 and C–2.

16. A compound of the following formula:

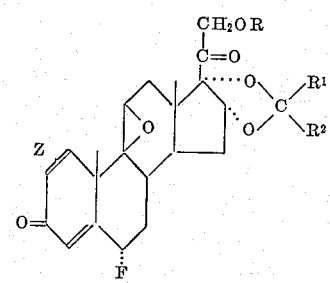

wherein R is a hydrocarbon carboxylic acyloxy group of less than 12 carbon atoms; R' and R² are each selected from the group consisting of hydrogen and a hydrocarbon group containing up to 14 carbon atoms; and Z is selected from the group consisting of a saturated linkage between C–1 and C–2 and a double bond between C–1 and C–2.

References Cited in the file of this patent

UNITED STATES PATENTS

| | | |
|---|---|---|
| 2,838,546 | Magerlein et al. | June 10, 1958 |
| 2,844,513 | Wettstein et al. | July 22, 1958 |
| 2,937,975 | Figdor et al. | May 24, 1960 |

OTHER REFERENCES

Fried et al.: J.A.C.S., vol. 80, pages 2338–2340, May 5, 1958.

Ringold et al.: J.A.C.S., vol. 80, 1958, pages 6464 and 6465.

Mills et al.: J.A.C.S., vol. 81, Mar. 5, 1959, pages 1262–1263.